United States Patent [19]
Dazet

[11] Patent Number: 5,823,471
[45] Date of Patent: Oct. 20, 1998

[54] SYSTEM FOR CONTROLLING A CONTROL SURFACE ARTICULATED TO A STRUCTURE OF A VEHICLE

[75] Inventor: Francis Dazet, Saint Alban, France

[73] Assignee: Aerospatiale Societe Nationale Industrielle, Paris, France

[21] Appl. No.: 688,095

[22] Filed: Jul. 29, 1996

[30] Foreign Application Priority Data

Aug. 8, 1995 [FR] France .................................. 95 09605

[51] Int. Cl.$^6$ ................................................. B64C 13/04
[52] U.S. Cl. ...................... 244/75 R; 244/224; 244/221; 244/213; 74/105; 74/96; 74/527
[58] Field of Search ................. 244/75 R, 224, 244/221, 226, 213; 74/105, 96, 527

[56] References Cited

U.S. PATENT DOCUMENTS

| | | | |
|---|---|---|---|
| 2,570,586 | 10/1951 | Nix | 244/224 |
| 2,577,439 | 12/1951 | Wendt . | |
| 2,669,401 | 2/1954 | Bosserman | 74/96 |
| 3,369,781 | 2/1968 | Cichy et al. . | |
| 4,119,118 | 10/1978 | Patel | 403/31 |

FOREIGN PATENT DOCUMENTS

| | | | |
|---|---|---|---|
| 359481 | 3/1990 | European Pat. Off. | 244/75 R |
| 2600035 | 12/1987 | France . | |
| 566851 | 1/1945 | United Kingdom | 244/226 |
| 2131363 | 6/1984 | United Kingdom | 244/75 R |
| 2164905 | 4/1986 | United Kingdom | 244/75 R |

*Primary Examiner*—Robert J. Oberleitner
*Assistant Examiner*—Tien Dinh
*Attorney, Agent, or Firm*—Stevens, Davis, Miller & Mosher, L.L.P.

[57] ABSTRACT

A system for controlling a control surface articulated to a structure of a vehicle about a first axis includes a tab articulated to the trailing edge of the control surface about a second axis parallel to the first axis, an elastic link provided between the control surface and the tab, a pilot input control mechanism to which the elastic link is connected and which acts on the tab, and an actuating member provided between the control surface and the link for keeping the tab/control surface assembly in any position whatever. The elastic link and the actuating member are arranged to be at least substantially parallel to the first axis of articulation of the control surface. The first axis is disposed near, and upstream from, the elastic link and the actuating member.

8 Claims, 4 Drawing Sheets

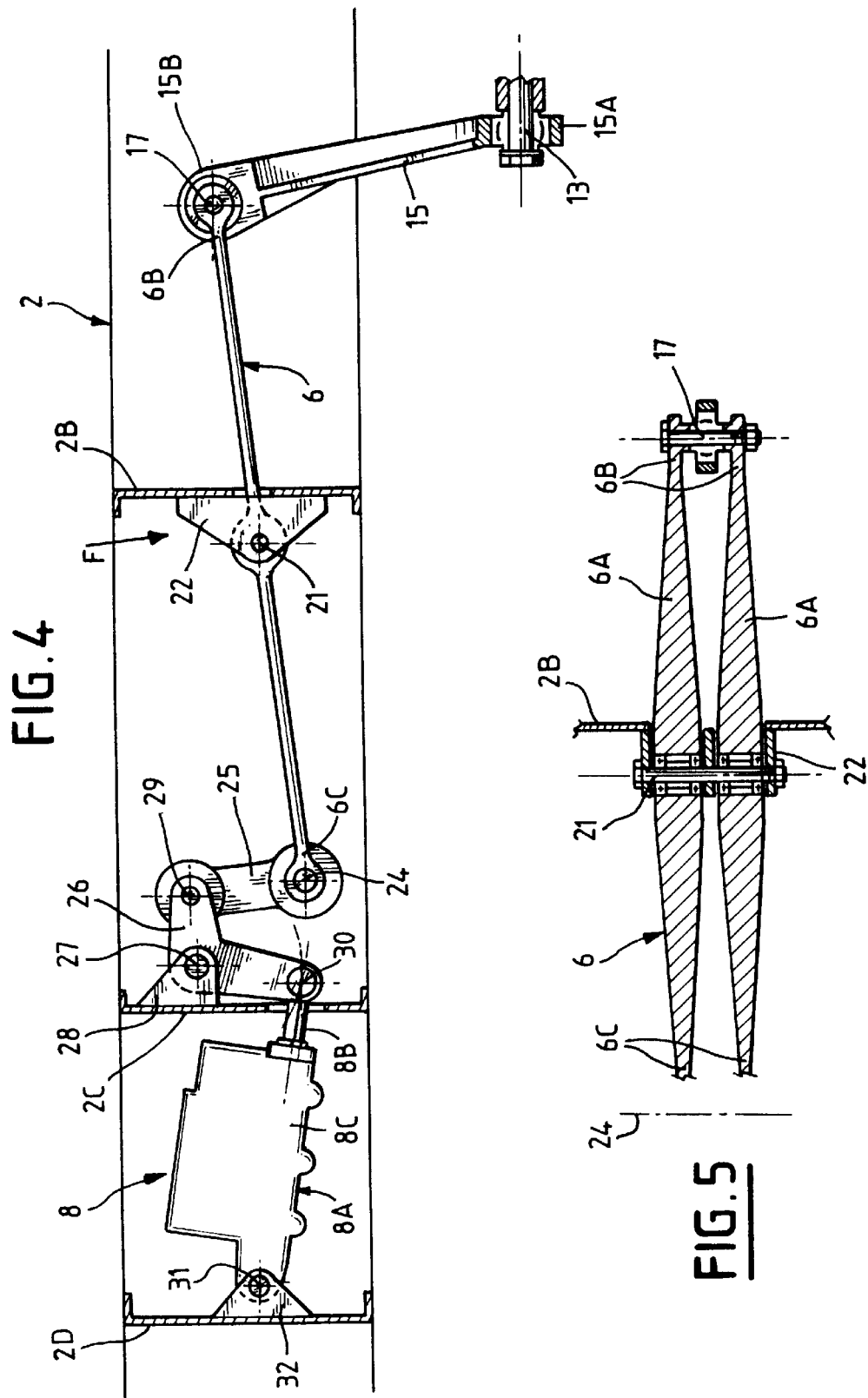

SYSTEM FOR CONTROLLING A CONTROL SURFACE ARTICULATED TO A STRUCTURE OF A VEHICLE

FIELD OF THE INVENTION

The present invention relates to a system for controlling a control surface articulated to a structure of a vehicle.

In a preferred application, the system is intended to be mounted on aircraft, such as airplanes without servocontrols, to allow the maneuvering of aerodynamic surfaces, such as ailerons, elevators and rudders connected to the trailing edge of the wings and of the horizontal and vertical empennages in question, and thus steer the airplane in the desired path. For this reason, the system will be described hereafter in relation to this application, but it could of course be mounted on other vehicles such as ships like submarines without departing from the scope of the invention.

DESCRIPTION OF RELATED ART

It is known that on airplanes without servocontrols, the systems for controlling certain control surfaces are designed so as to reduce the effort that the pilot has to exert in order to turn the control surface in question in one direction or in the other and orientate the airplane in the desired path. Such a system for controlling a control surface articulated about a first fixed axis embodied by a pin secured to the structure of the airplane is, for example, taught by the French patent FR-2 600 035 of the Applicant Company.

In particular, this system includes especially:

a tab articulated to the trailing edge of said control surface about a second pin of axis parallel to said first axis and linked to the control surface;

elastic linking means provided between said control surface and said tab;

a pilot input control mechanism to which said elastic means are connected and which can act on said tab to cause it to turn in one direction and, simultaneously, to cause the control surface to turn in the other direction; and an actuating member provided between said control surface and said linking means, capable of keeping the tab/control surface assembly in any position whatever imposed by said pilot input control mechanism.

Thus, when the pilot acts on the pilot input control mechanism (consisting especially of a rudder bar with pedals and with a linkage), the tab (which is of a small size by comparison with the control surface) is turned and pivots about the second axis in the chosen direction, and the elastic linking means are deformed. Under the action of the aerodynamic forces acting on the tab thus turned and the action of the elastic means, the control surface thus adopts the turned position by pivoting in the other direction about the first axis of articulation. If the pilot wishes to maintain the new turned position of the tab/control surface assembly, he commands the actuating member which keeps said position for the time necessary for the maneuver so that, since the control surface is in a position of aerodynamic equilibrium, the pilot can relax his effort on the pilot input control mechanism.

Although it effectively fulfills the functions of sprung tab and of balancing, this control system does nevertheless have certain negative aspects.

Indeed in this known system, as is in any case the situation in most systems of this type, the elastic linking means and the actuating member (respectively in the form of a coil spring and of an actuator), especially, are arranged transversely to the axis of articulation of the control surface, that is to say within the latter, toward its trailing edge, for reasons inherent to its operation. In this way, since these are weighty components, the center of gravity of the control surface is situated quite far from the axis of articulation toward the trailing edge, so that the conditions of equilibrium of the control surface are not fulfilled.

Also, in order to attempt to bring the center of gravity back towards the axis of articulation and therefore achieve better balancing of the control surface, balancing weights may be provided at the axis of articulation, but then that increases the mass of the control surface and puts yet more stress on its articulation.

Moreover, the transverse arrangement of the elastic means, actuating member and other maneuvering levers leads to the making of openings in the partitions and structural spars of the control surface, as well as in the surface coverings, so that its rigidity is thereby affected.

SUMMARY OF THE INVENTION

The object of the present invention is to alleviate these drawbacks.

To this end, the system for controlling a control surface articulated to a structure of a vehicle about a first fixed axis embodied by a pin linked to said structure, of the type described hereinabove, is noteworthy, according to the invention, in that said elastic linking means and said actuating member are arranged at least substantially parallel to said first axis of articulation of the control surface, being situated in proximity thereto and upstream thereof, and in that it additionally comprises an intermediate mechanical member actuated by said pilot input control mechanism and actuating a first connecting rod connected to said elastic means, a second connecting rod connected to said tab and an arm connected to the control surface.

Thus, the layout of the elastic linking means and of the actuating member, parallel and close to the axis of articulation of the control surface, has the advantage of bringing the center of gravity of the control surface back toward its axis of articulation, which gives better balancing thereof and appreciably reduces the size of the balancing weights. Moreover, such a layout of the elastic means and of the actuating member running along the leading edge of the control surface eliminates most of the openings usually necessary for the passage of the elastic means, actuating member and other levers when the system is mounted transversely to the control surface, and this makes it possible to conserve its rigidity. Advantageously, the intermediate mechanical member is therefore independent of the control surface and avoids direct linkage therewith, minimizing the efforts exerted on its articulation pin when it is actuated via said system.

As a preference, said elastic means and said actuating member are substantially aligned parallel to said first axis of articulation of said control surface, said elastic means being connected, on the one hand, to said actuating member and, on the other hand, to said first connecting rod.

In particular, said actuating member may consist of an actuator, the body of which is articulated about an axis to said control surface, and the rod of which is connected to said elastic linking means. Also, said elastic linking means may be defined by at least one leaf spring which is mounted so that it can pivot about an axis embodied by a pin linked to the control surface and connected, at its respective ends, to said actuating member and to said first connecting rod.

Furthermore, between said actuator and said leaf spring there are provided a cranked lever and a coupling link articulated to one another about an axis, said spring being linked to said coupling link by a pin, whereas said lever is articulated to the control surface, at its cranked part, and to the rod of said actuator by respective pins. Thus, said actuator can keep one of the ends of the leaf spring in position while the other end of the leaf spring is stressed by the action of the pilot via the pilot input control mechanism, the intermediate member and the first connecting rod when turning the tab/control surface assembly, and allow the pilot to relax his turning effort if he wishes to continue this phase of the flight, by altering the position of this end of the spring which pivots about its articulation pin linked to the control surface.

Furthermore, said axes of articulation of said actuator, of said leaf spring, of said cranked lever and of the coupling link are mutually parallel and are orthogonal to the first axis of articulation of said control surface.

Advantageously, said leaf spring is mounted so that it can pivot on said control surface by means of a component which is mounted so that it can be adjusted relative to the control surface and carrying said articulation pin for said spring. This arrangement thus makes it possible easily on the ground to adjust the elastic linking means.

As far as said intermediate mechanical member is concerned, the latter is linked to the pilot input control mechanism, to the first and second connecting rods and to the arm, respectively about pins which are mutually parallel and parallel to the first axis of articulation of said control surface.

For example, said intermediate mechanical member may be situated at the end of said control surface. Quite obviously a cap may cover the member thus projecting, so as to be connected to said control surface.

What is more, said second connecting rod is connected to said tab via a lever to which said second connecting rod is articulated and which is associated, in an adjustable fashion, with said tab. It is thus possible accurately to adjust its position relative to the tab.

BRIEF DESCRIPTION OF THE DRAWINGS

The figures of the attached drawing will make it easy to understand how the invention may be achieved. In these figures, identical references denote similar elements.

FIG. 4 is a plan view of the elastic means and of the actuating member of said system shown in FIG. 2.

FIG. 5 is a view of said elastic means in the direction of the arrow F of FIG. 4.

DETAILED DESCRIPTION OF THE PREFERRED EMBODIMENTS

Figure 1:
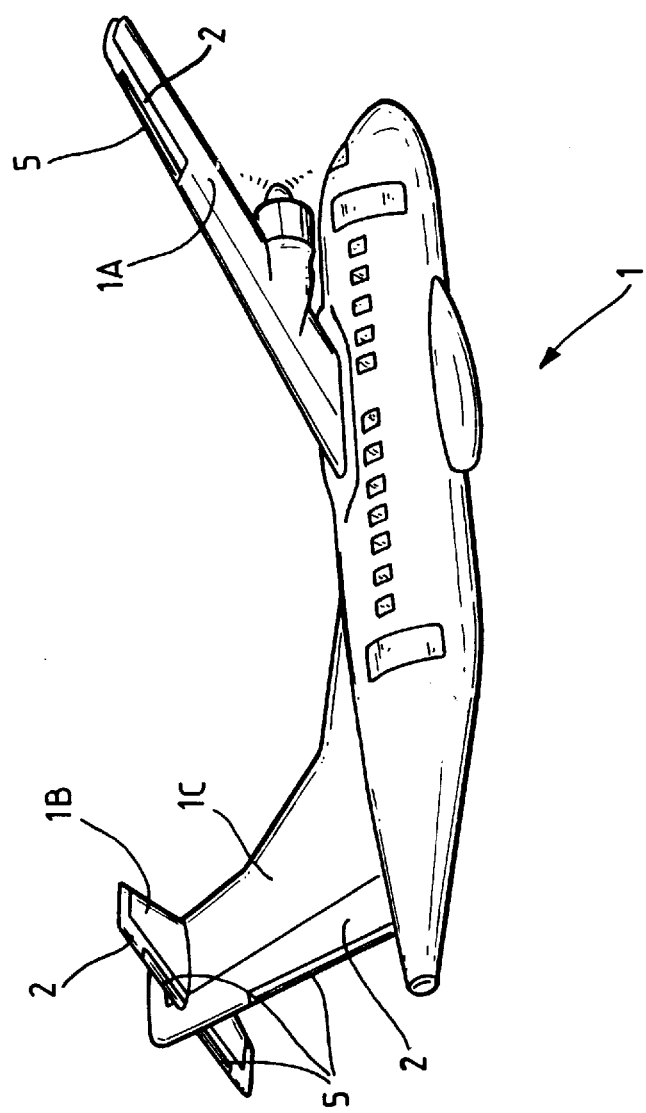
FIG. 1 represents, in perspective, an airplane in which the control for the control surfaces represented is achieved using the system of the invention.

The airplane 1 represented in FIG. 1 and known as a "commuter plane" by specialists, comprises control surfaces or aerodynamic surfaces 2, respectively articulated to the rear of its wings 1A, of its horizontal empennage 1B and of its vertical empennage 1C, in order to control the airplane about its reference axes of roll, pitch and yaw, along the desired path. This type of airplane 1, as is, in any case, the situation with most airplanes with a low transport capacity, does not have servocontrols, so that the control surfaces are actuated from mechanical systems maneuvered directly by the pilot.

The system 3 of the invention, intended to control the control surface 2 situated, in this case, at the end of the wing 1A of the airplane, will be described hereafter, it being understood that similar systems act on the other aforementioned control surfaces.

Figure 2:
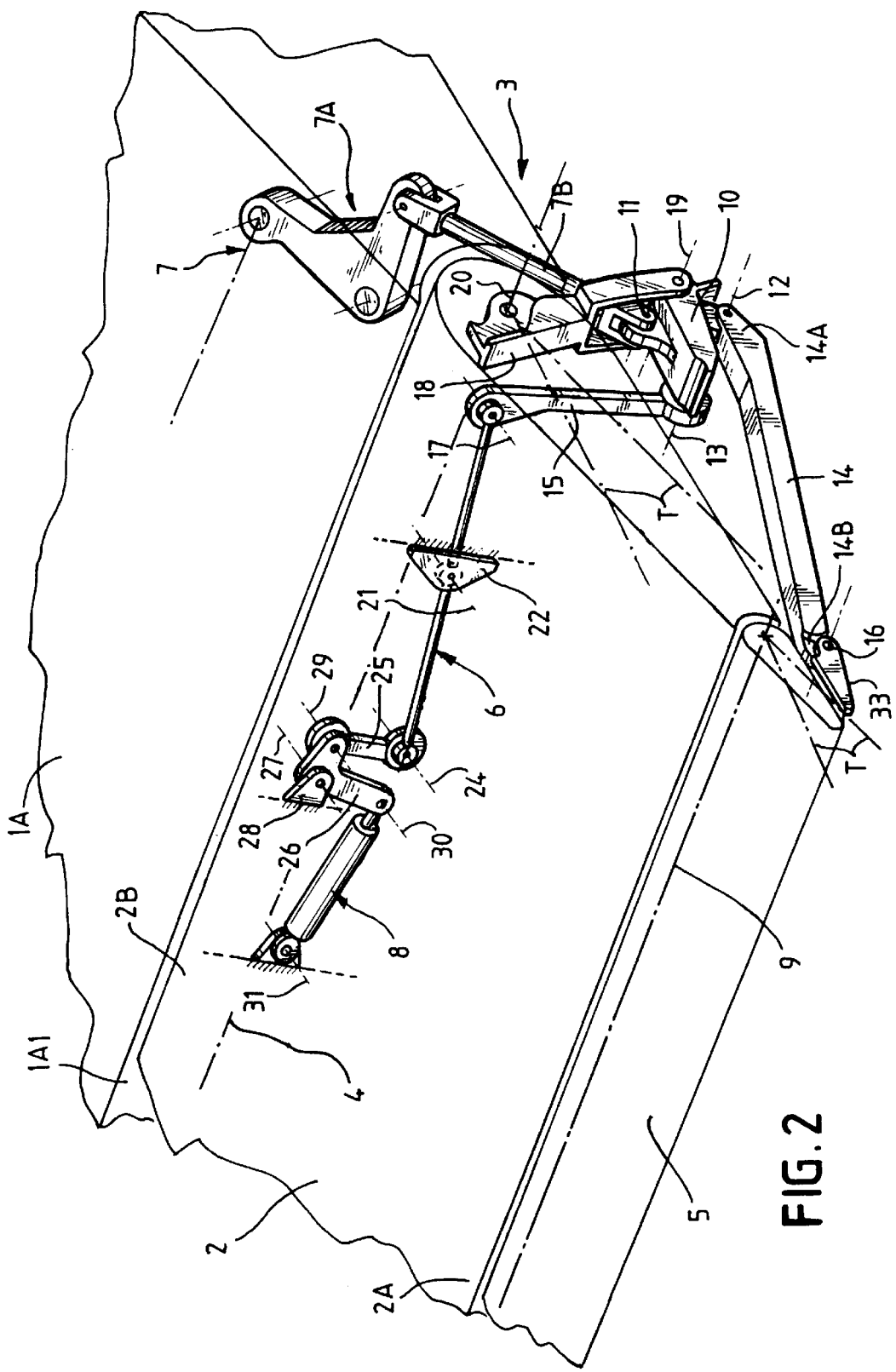
FIG. 2 is a view in diagrammatic perspective of the system in accordance with the invention, capable of controlling one of the ailerons of said aircraft.
Figure 3:
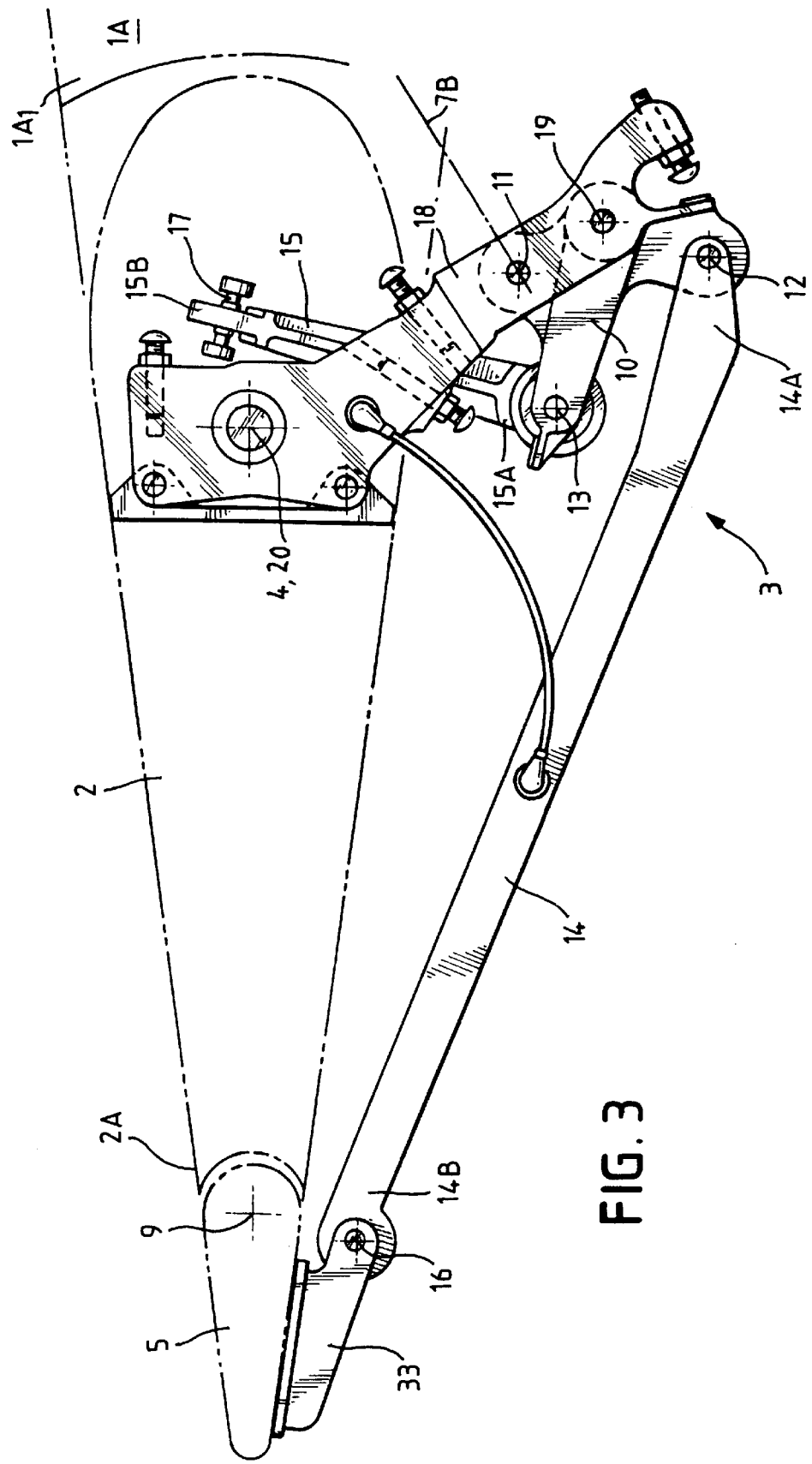
FIG. 3 is an end-on view of said control system shown in FIG. 2.

As shown especially by FIGS. 2 and 3, the control surface 2 is mounted so that it can move on the rear part 1A1 of the wing 1A about a pin (not shown) defining a first axis of turning 4 of the control surface for the system 3. The latter is composed mainly of a tab 5, of elastic linking means 6, of a pilot input control mechanism 7 and of an actuating member 8.

In particular, the tab 5 of the control system 3 is articulated to the trailing edge 2A of the control surface about a second pin of axis 9, parallel to the first axis 4 and linked to the control surface 2. This tab 5, the purpose of which is to reduce the maneuvering efforts that the pilot has to exert on the control surface 2 in order to turn it is therefore actuated directly by the pilot via the pilot input control mechanism 7, only the downstream end of the linkage 7A of which is represented in the figures. This mechanism 7 comprises, upstream of the linkage, for example, a rudder bar with pedals which has not been illustrated and on which the pilot can act in order, via the tab 5, to obtain the turning of the control surface 2 in one direction or in the other.

The elastic linking means 6 are of the type with a spring and are provided between the control surface 2 and the tab 5, being connected to the pilot input control mechanism 7. The turning of the control surface 2 about the first axis 4 is obtained by controlling the tab 5 about the second axis 9, by means of the mechanism 7 and by the elastic means 6 which allow the pilot to "feel" the effort he is exerting.

The actuating member 8 is arranged between the control surface 2 and the elastic linking means 6 and it is defined, for example, by an actuator 8A. This member 8, when controlled, keeps the tab/control surface assembly in equilibrium in any turned position whatever, which allows the airplane 1 to keep the heading imposed by the action of the pilot, and possibly allows the latter to relax his control effort for the time necessary for this phase of the flight.

As shown especially by FIGS. 2 and 4, the elastic linking means 6 and the actuating member 8 are housed inside the control surface 2 and are arranged at least substantially parallel with the first axis of articulation 4. They are substantially in line and advantageously situated close to said first axis, between the latter and the rear part 1A1 of the wing, that is to say on the leading edge 2B side of the control surface. Because of this layout, the center of gravity of the control surface 2 is brought closer to its axis of articulation 4, thus contributing to balancing this control surface still further and to reducing the maneuvering efforts exerted on its pin. In addition, an intermediate mechanical member 10 is arranged between said mechanism 7 and the tab 5 and control surface 2 and it makes it possible to actuate the tab 5 and the elastic means 6 without acting directly on the control surface. This member is thus independent of the control surface 2.

Structurally, as FIGS. 2 and 3 show, the intermediate mechanical member 10 is connected to a lever 7B forming the downstream end of the linkage 7A, about an axis 11 parallel to the first axis of articulation 4 of the control surface 2. Moreover, articulated to this member 10 about pins of axes 12 and 13, are the ends 15A and 14A of a first connecting rod and a second connecting rod 15 and 14 respectively. The other opposite ends 14B, 15B of these are articulated, about pins of axes 16 and 17, respectively to the tab 5 and to the elastic linking means 6. Finally, the mechanical member 10 is connected to the control surface 2 by an arm 18, the opposite ends of which are mounted respectively on said member and on the structure of the control surface via pins 19 and 20 respectively.

In general, the aforementioned pins are preferably ball-jointed, and the pins of axes 12, 13 and 19 especially are mutually parallel and parallel to the other axes 4, 9 and 11, the axis 20 coinciding with the axis 4.

When the pilot input control mechanism 7 is maneuvered, the mechanical member 10 is actuated and, at the same time, it in turn actuates the connecting rods 14 and 15 and the arm 18 which pivots about the control surface 2.

As far as the elastic linking means 6 are concerned, they are defined, in this embodiment shown in FIGS. 4 and 5, by two leaf springs 6A, arranged in parallel with respect to each other and which are identical. These two leaf springs 6A are mounted pivoting substantially at their middle, about a pin of axis 21 borne by a component forming a bearing 22 which is fixed, so its position can be adjusted, on an internal partition 2B of the structure of the control surface 2. In this way, the position of the springs can be altered, on the ground, by adjusting the component 22. More specifically, the first ends 6B of the two springs are arranged on the pin of axis 17 which also supports the end 15B of the second connecting rod 15 via a ball joint. Also, the second ends 6C of the two springs are mounted on a pin of axis 24 which also supports a coupling link or link rod 25. These pins of axes 21, 23 and 24 are mutually parallel and substantially orthogonal to the articulation axes of the control surface 2 and of the intermediate mechanical member 10. It will be noted that the pins of axes 13 and 17 linked to the connecting rod 15 are mutually orthogonal.

The coupling link 25, as well as a component 26 bent into an L, provide the link between the two leaf springs 6A and the actuator 8A of the actuating member. It will be observed, especially in FIGS. 1 and 4, that the cranked part of the component 26 is linked by a pin of axis 27 to a bearing 28 secured to an internal partition 2C of the control surface.

One of the ends of the cranked component 26 is linked, via a pin of axis 29, to the opposite end of the coupling link 25 to the one linked to the pin of axis 24, while the other end of said component 26 is mounted, via a pin 30, at the end of the rod 8B of the actuator 8A. Quite clearly, the axes 27, 29 and 30 are parallel to the axes 17, 21 and 24. The body 8C of the actuator is borne, via a pin of axis 31 parallel to the previous ones, by a bearing 32 secured to an internal partition 2D of the control surface, parallel to the partitions 2B, 2C.

It may thus be seen in FIGS. 1 and 4 that the actuator 8A, the cranked component 26, the coupling link 25 and the leaf springs 6A are substantially in line and arranged in one and the same plane, parallel and close to the axis of articulation of the control surface 2.

Moreover, the end 14B of the first connecting rod 14 is mounted, via the pin of axis 16, on a lever 33 which is fixed, adjustably, to the tab 5, this making it possible to be able, on the ground, to adjust the desired positions and movements of the system and of the tab.

The control system 3 operates as follows.

First of all, it is assumed that the control surface 2 and the tab 5 are aligned with each other, substantially in the same plane as the wing 1A, as FIGS. 2 and 3 show. It is assumed that the position of the assembly is maintained in equilibrium by the action of the control actuator 8A.

When the pilot wishes to alter the path of the aircraft, the lever 7B of the linkage controlled by the pilot acts on the intermediate mechanical member 10 via the pin of axis 11, and makes it rotate about the axis 19. This rotational movement, which corresponds to a given angular displacement of said mechanical member 10 leads to a displacement of the second connecting rod 14 via the pin of axis 12, which results in the rotation through a given angle of the tab 5 about the second axis of articulation 9, via the pin of axis 16 and the lever 33. The tab rotates in one direction or the other depending on whether the connecting rod 14 pulls or pushes the tab, following actuation of the linkage and rotation of the member 10.

At the same time as the tab 5 rotates, the mechanical member 10, rotating about the axis 19, causes the pin of axis 13 to be displaced angularly, so that the first connecting rod 15 acts, via the pin of axis 17, on the leaf springs 6A which deform elastically. The pin of axis 24, which carries the ends 6C of the springs, is held in position by the coupling link 25 and the lever 26, the latter being linked to the control surface and immobilized by the actuator 8A.

Under the action of the aerodynamic forces exerted on the tab 5 and under the action of the springs 6A the control surface 2 then adopts the new turned position imposed by the pilot, pivoting about its axis 4 in a direction the opposite of that of the tab 5. The chain lines T in FIG. 2 illustrate the maximum angular positions that can be occupied by the tab and the control surface.

If the pilot wishes to keep the airplane 1 on the new path thus established and to relax his effort on the pilot input control mechanism 7, he can control the actuator 8A, the rod 8B of which causes the cranked lever 26 to pivot about its pin of axis 27 which, in turn and via the coupling link 25, leads to the displacement of the pin of axis 24 connected to the ends 6C of the springs until the latter are no longer stressed.

Equilibrium of the control surface/tab assembly thus turned is ensured, and the pilot can relax his effort on the pilot input mechanism for the time necessary for this phase of the flight.

A cap, not represented in the figures, may of course cover the components of the system projecting from the control surface.

I claim:

1. A system for controlling a control surface articulated to a structure of a vehicle about a first fixed axis, the control surface having a trailing edge, the system comprising:

a tab articulated to the trailing edge of said control surface about a second axis parallel to said first axis;

elastic linking means, comprising at least one leaf spring which has a first end and a second end, said elastic linking means being mounted to pivot about a third axis relative to said control surface;

a pilot input control mechanism for acting on said tab to cause said tab to turn in a first direction and, simultaneously, to cause the control surface to turn in a second direction which is opposite to said first direction, so as to cause said tab to be disposed in a first position selected through the pilot input control mechanism and to cause said control surface to be disposed in a second position selected through the pilot input control mechanism;

an actuating member for keeping the tab in the first position and for keeping the control surface in the second position;

a first connecting rod connected to said elastic linking means;

a second connecting rod connected to said tab;

an arm connected to said control surface; and an intermediate mechanical member actuated by said pilot input control mechanism for actuating said first connecting rod, said second connecting rod and said arm;

wherein:

said at least one leaf spring is connected at said first end to said actuating member and at said second end to said first connecting rod; and said elastic linking means and said actuating member are arranged to be at least substantially parallel to said first axis, situated in proximity to said first axis and upstream from said first axis relative to a motion of said vehicle.

2. The system as claimed in claim 1, wherein said actuating member comprises an actuator having:

an actuator body which is articulated about an actuator axis to said control surface; and an actuator rod which is connected to said elastic linking means.

3. The system as claimed in claim 1, wherein:

said actuating member comprises a rod and is connected to said at least one leaf spring by a cranked lever and a coupling link, the cranked lever comprising a cranked part;

said cranked lever and said coupling link are articulated to each other about a cranked lever-coupling link axis;

said at least one leaf spring is linked to said coupling link by a pin; and said cranked lever is articulated to the control surface, at the cranked part, and to the rod of said actuating member by pins.

4. The system as claimed in claim 1, wherein:

said actuating member is articulated to said control surface about an actuator axis;

said actuating member is connected to said at least one leaf spring through a cranked lever and a coupling link, the cranked lever having a cranked part;

said actuating member is articulated to said cranked lever about a fourth axis;

said cranked part is articulated to said control surface about a fifth axis;

said cranked lever is articulated to said coupling link about a sixth axis;

said coupling link is articulated to said elastic linking means about a seventh axis;

said elastic linking means is articulated to said first connecting rod about an eighth axis; and said third through eighth axes are mutually parallel and are orthogonal to the first axis.

5. The system as claimed in claim 1, wherein said at least one leaf spring is mounted so as to pivot on said control surface by a component which is mounted on said control surface so as to be adjustable relative to the control surface, said control surface carrying an articulation pin about which said at least one leaf spring is articulated about said third axis.

6. The system as claimed in claim 1, wherein said intermediate mechanical member is linked to the pilot input control mechanism, to the first and second connecting rods and to the arm, respectively about pins which are mutually parallel and which are parallel to the first fixed axis.

7. The system as claimed in claim 1, wherein said intermediate mechanical member is situated at an end of said control surface.

8. The system as claimed in claim 1, further comprising a lever connecting said second connecting rod to said tab, said second connecting rod being articulated to said lever, and said lever being adjustably fixed to said tab.

* * * * *